(12) United States Patent
Nakamura et al.

(10) Patent No.: US 10,378,391 B2
(45) Date of Patent: Aug. 13, 2019

(54) WASTE HEAT RECOVERY DEVICE

(71) Applicant: SANDEN HOLDINGS CORPORATION, Isesaki-shi, Gunma (JP)

(72) Inventors: Shinji Nakamura, Isesaki (JP); Yasuaki Kano, Isesaki (JP)

(73) Assignee: SANDEN HOLDINGS CORPORATION, Isesaki-shi, Gunma (JP)

( * ) Notice: Subject to any disclaimer, the term of this patent is extended or adjusted under 35 U.S.C. 154(b) by 173 days.

(21) Appl. No.: 15/517,234

(22) PCT Filed: Oct. 8, 2015

(86) PCT No.: PCT/JP2015/078561
§ 371 (c)(1),
(2) Date: Apr. 6, 2017

(87) PCT Pub. No.: WO2016/056611
PCT Pub. Date: Apr. 14, 2016

(65) Prior Publication Data
US 2017/0306804 A1    Oct. 26, 2017

(30) Foreign Application Priority Data

Oct. 9, 2014    (JP) .................................. 2014-207931

(51) Int. Cl.
*F01K 23/10* (2006.01)
*F01K 23/06* (2006.01)
(Continued)

(52) U.S. Cl.
CPC ............ *F01K 23/065* (2013.01); *F01K 23/06* (2013.01); *F01K 23/10* (2013.01); *F01P 3/20* (2013.01);
(Continued)

(58) Field of Classification Search
CPC ....................... F01K 23/065; Y02T 10/16–166
See application file for complete search history.

(56) References Cited

U.S. PATENT DOCUMENTS 3,945,210 A * 3/1976 Chapin ................. F01K 23/065
                                                    60/618
5,351,487 A * 10/1994 Abdelmalek ............ B60K 6/24
                                                    60/618
(Continued)

FOREIGN PATENT DOCUMENTS

JP    2005042618 A    2/2005
JP    2008038916 A    2/2008
(Continued)

OTHER PUBLICATIONS

International Search Report (English and Japanese) and PCT Written Opinion (Japanese) dated Jan. 12, 2016, issued in corresponding PCT International Application No. PCT/JP2015/078561.

*Primary Examiner* — Mark A Laurenzi
*Assistant Examiner* — Shafiq Mian
(74) *Attorney, Agent, or Firm* — Troutman Sanders LLP

(57) ABSTRACT

In a waste heat recovery device comprising a Rankine cycle in which working fluid circulates and a cooling circuit in which coolant water of an engine circulates, a heat source of a heater of the Rankine cycle is waste heat of the engine. A condenser of the Rankine cycle is configured to exchange heat between the working fluid and coolant water of a third coolant water circuit configured to circulate coolant water having passed through a radiator without passing through the engine.

8 Claims, 2 Drawing Sheets

(51) Int. Cl.
  *F02G 5/00* (2006.01)
  *F02G 5/02* (2006.01)
  *F01P 3/20* (2006.01)
  *F01P 5/10* (2006.01)
  *F01P 7/16* (2006.01)
  *F28B 1/02* (2006.01)
  *F01P 7/14* (2006.01)

(52) U.S. Cl.
  CPC ............... *F01P 5/10* (2013.01); *F01P 7/165* (2013.01); *F02G 5/00* (2013.01); *F02G 5/02* (2013.01); *F28B 1/02* (2013.01); *F01P 2007/146* (2013.01); *F01P 2025/08* (2013.01); *F02G 2260/00* (2013.01); *Y02T 10/166* (2013.01)

(56) References Cited

U.S. PATENT DOCUMENTS

| | | | | |
|---|---|---|---|---|
| 7,578,139 | B2 * | 8/2009 | Nishikawa | B60H 1/3211 62/228.3 |
| 8,528,333 | B2 * | 9/2013 | Juchymenko | F01K 23/065 60/618 |
| 9,441,576 | B2 * | 9/2016 | Kasuya | F01K 23/065 |
| 9,683,463 | B2 * | 6/2017 | Juchymenko | F01K 23/065 |
| 9,970,329 | B2 * | 5/2018 | Tanaka | F01K 23/101 |
| 2004/0237576 | A1 * | 12/2004 | Sasaki | B60H 1/00328 62/498 |
| 2005/0262842 | A1 * | 12/2005 | Claassen | F01K 23/065 60/618 |
| 2006/0026981 | A1 * | 2/2006 | Inaba | B60H 1/3222 62/238.6 |
| 2006/0254276 | A1 * | 11/2006 | Sato | F01K 23/101 60/645 |
| 2009/0013705 | A1 * | 1/2009 | Nishikawa | B60H 1/00 62/239 |
| 2009/0211253 | A1 * | 8/2009 | Radcliff | F01K 23/065 60/670 |
| 2011/0041505 | A1 * | 2/2011 | Kasuya | F01K 23/065 60/660 |
| 2013/0086902 | A1 * | 4/2013 | Khadiya | F01K 23/065 60/597 |
| 2016/0053666 | A1 * | 2/2016 | Bruemmer | F01P 3/22 123/41.1 |
| 2017/0356321 | A1 * | 12/2017 | Ernst | F01N 5/02 |

FOREIGN PATENT DOCUMENTS

| | | | |
|---|---|---|---|
| JP | 2013160076 A | 8/2013 | |
| WO | 2014/102027 A2 | 7/2014 | |
| WO | 2014/103977 A1 | 7/2014 | |
| WO | WO 2015197456 A1 * | 12/2015 | ........... F01K 23/065 |

* cited by examiner

WASTE HEAT RECOVERY DEVICE

CROSS-REFERENCE TO RELATED APPLICATIONS

This is a U.S. national phase application under 35 U.S.C. § 371 of International Patent Application No. PCT/JP2015/078561, filed Oct. 8, 2015, and claims benefit of priority to Japanese Patent Application No. 2014-207931, filed Oct. 9, 2014. The entire contents of these applications are hereby incorporated by reference.

TECHNICAL FIELD

The present invention relates to a waste heat recovery device including a Rankine cycle having a refrigerant pump configured to circulate working fluid, a heater configured to heat, using waste heat of an engine of a vehicle, the working fluid fed by the refrigerant pump, an expander configured to expand the working fluid heated and evaporated by the heater to generate an output, and a Rankine condenser configured to condense the working fluid expanded by the expander.

BACKGROUND

A vehicle waste heat recovery device including a Rankine cycle as disclosed in Japanese Unexamined Patent Application Publication No. 2005-42618 has been known as a typical technique. The vehicle waste heat device including the Rankine cycle is configured to exchange heat between combustion gas discharged from an engine and working fluid circulating in the Rankine cycle in a steam generator, thereby recovering engine waste heat. An expander is configured to expand the high-temperature high-pressure working fluid heated by the steam generator to generate an output. A heat exchanger is configured to exchange heat between the working fluid having expanded by the expander and engine coolant water circulating in an engine coolant water circuit, thereby condensing the working fluid.

However, the vehicle waste heat utilization device disclosed in Japanese Unexamined Patent Application Publication No. 2005-42618 uses engine coolant water having been used for engine cooling to condense the working fluid. Thus, the working fluid cannot be sufficiently condensed in the heat exchanger. For this reason, there is a problem that the Rankine cycle cannot be sufficiently operated due to a high condensation pressure.

On the other hand, in a vehicle waste heat recovery device including a Rankine cycle as illustrated in FIG. 2 of Japanese Unexamined Patent Application Publication No. 2013-160076, coolant water on an upstream side of a radiator is used as a heat source of a steam generator for the purpose of solving the above-described problem. A condenser as a heat exchanger is configured to exchange heat between working fluid and coolant water on a downstream side of the radiator configured to cool coolant water of an internal combustion engine. As described above, in the condenser of Japanese Unexamined Patent Application Publication No. 2013-160076, heat is exchanged between low-temperature coolant water cooled by the radiator and the working fluid. This decreases a condensation pressure, leading to a high thermal efficiency of a heat engine. Thus, Japanese Unexamined Patent Application Publication No. 2013-160076 discloses the effect of providing a great amount of waste heat regeneration.

SUMMARY

However, in the condenser of the waste heat utilization device of Japanese Unexamined Patent Application Publication No. 2013-160076, heat is exchanged between the low-temperature coolant water cooled by the radiator and the working fluid. For this reason, the condensation pressure is lower as compared to the case where the working fluid is condensed using the engine coolant water having been used for engine cooling as in the heat exchanger of Japanese Unexamined Patent Application Publication No. 2005-42618. This leads to a high thermal efficiency of the heat engine. However, all of the coolant water flowing into the radiator is the coolant water having been used for engine cooling and having absorbed waste heat of the engine. For this reason, there is still a problem that the condensation pressure of the working fluid cannot be sufficiently decreased.

The present invention has been made to solve these problems. According to the present invention, heat is exchanged between lower-temperature coolant water and working fluid. With this configuration, a waste heat recovery device with an improved thermal efficiency of a Rankine cycle can be provided.

An example of the invention to obtain the above object is a waste heat recovery device including: a Rankine cycle including a working fluid circuit configured such that a heater configured to heat and evaporate working fluid, an expander configured to expand the working fluid having passed through the heater to generate power, a condenser configured to condense the working fluid having passed through the expander, and a working fluid pump configured to feed, to the heater, the working fluid having passed through the condenser are sequentially arranged; a first coolant water circuit configured to circulate coolant water by way of an internal combustion engine and a radiator; a second coolant water circuit configured to circulate the coolant water by way of the internal combustion engine and a first branched path branched between the internal combustion engine and the radiator; and a third coolant water circuit configured to circulate the coolant water by way of the radiator and a second branched path branched between the first branched path and the radiator. A heat source of the heater is waste heat of the internal combustion engine, and the condenser is a heat exchanger configured to exchange heat between the working fluid and the coolant water of the third coolant water circuit.

In addition, an example of an invention is the waste heat recovery device according to the above. A first water pump configured to circulate the coolant water is provided between the internal combustion engine and the first branched path, a second water pump configured to circulate the coolant water is provided at the second branched path, and an opening degree adjustment unit configured to adjust a path opening degree of each of the first and second coolant water circuits based on a coolant water temperature after passage through the internal combustion engine is provided at a branching point of the first branched path.

In addition, an example of an invention is the waste heat recovery device, in which a check valve configured to prevent a backflow of the coolant water toward the radiator is provided between the first branched path and the second branched path on a downstream side of the radiator in the first coolant water circuit.

In addition, an example of an invention is the waste heat recovery device, including: a waste heat state detection unit configured to detect a waste heat state of the internal combustion engine; and a control unit configured to control driving of the second water pump and driving of the working fluid pump. When the waste heat state of the internal combustion engine detected by the waste heat state detection unit exceeds a first predetermined value, the control unit drives the second water pump and the working fluid pump.

In addition, an example of an invention is the waste heat recovery device including a Rankine output calculation unit configured to calculate an output of the Rankine cycle, and when the Rankine output calculated by the Rankine output calculation unit is a negative value, driving of the second water pump and the working fluid pump is stopped.

In addition, an example of an invention is the waste heat recovery device, in which the heater is a heat exchanger configured to exchange heat between the working fluid and the coolant water of the second coolant water circuit.

In addition, an example of an invention is the waste heat recovery device, including: a coolant water temperature detection unit configured to detect the coolant water temperature after passage through the internal combustion engine; and a control unit configured to control driving of the second water pump and driving of the working fluid pump. When the coolant water temperature detected by the coolant water temperature detection unit exceeds a first predetermined temperature, the control unit drives the second water pump and the working fluid pump.

In addition, an example of an invention is the waste heat recovery device. The control unit includes a Rankine output calculation unit configured to calculate an output of the Rankine cycle, and when the coolant water temperature detected by the coolant water temperature detection unit is equal to or lower than the first predetermined temperature or the Rankine output calculated by the Rankine output calculation unit is a negative value, the control unit stops driving of the second water pump and the working fluid pump.

In addition, an example of an invention is the waste heat recovery device, in which the first predetermined temperature is set higher than a minimum coolant water temperature for preventing overcooling of the internal combustion engine and lower than the coolant water temperature after passage through the internal combustion engine when the path opening degree of the first coolant water circuit is changed from a closed state to an open state by the opening degree adjustment unit.

According to an example, a Rankine cycle including a working fluid circuit configured such that a heater configured to heat and evaporate working fluid, an expander configured to expand the working fluid having passed through the heater to generate power, a condenser configured to condense the working fluid having passed through the expander, and a working fluid pump configured to feed, to the heater, the working fluid having passed through the condenser are sequentially arranged; a first coolant water circuit configured to circulate coolant water by way of an internal combustion engine and a radiator; a second coolant water circuit configured to circulate the coolant water by way of the internal combustion engine and a first branched path branched between the internal combustion engine and the radiator; and a third coolant water circuit configured to circulate the coolant water by way of the radiator and a second branched path branched between the first branched path and the radiator are included. A heat source of the heater is waste heat of the internal combustion engine, and the condenser is a heat exchanger configured to exchange heat between the working fluid and the coolant water of the third coolant water circuit. Thus, heat can be, using the condenser, exchanged between the working fluid flowing in the Rankine cycle and the coolant water having passed through the radiator without passing through the internal combustion engine. Thus, the effect of sufficiently condensing the working fluid to decrease the condensation pressure of the working fluid can be provided. Moreover, the effect of improving the thermal efficiency of the Rankine cycle by a simple structure merely utilizing an existing radiator can be provided.

DETAILED DESCRIPTION

Figure 1:
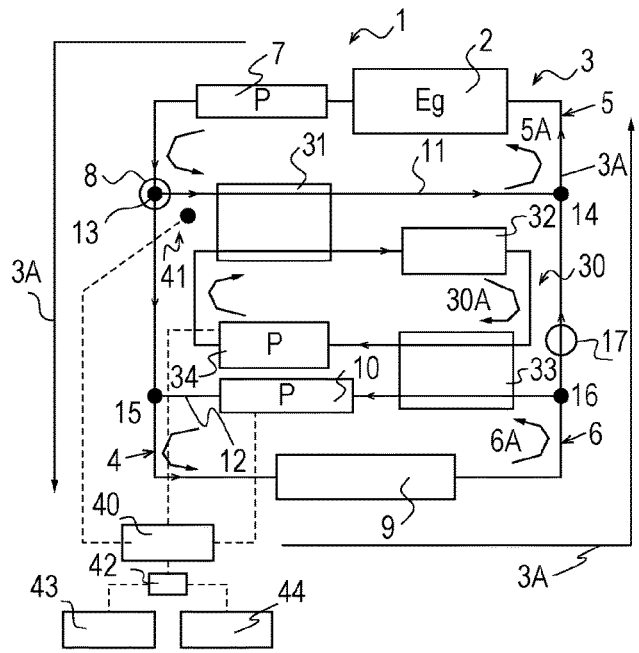
FIG. 1 is a configuration diagram of a vehicle waste heat recovery device of an example.

Next, an example of the present invention will be described with reference to drawings. FIG. 1 is a configuration diagram of a vehicle waste heat recovery device 1 of a first embodiment of the present invention. The vehicle waste heat recovery device 1 of the first embodiment includes an engine 2 as an internal combustion engine mounted on a vehicle, a coolant water circuit 3 configured to cool the engine 2, and a Rankine cycle 30 configured to convert waste heat of the engine 2 into electric power or rotary drive force for assisting the engine to recover the waste heat.

The coolant water circuit 3 includes the engine 2, a first water pump 7, a thermostat 8, and a radiator 9 sequentially interposed in a circulation path 3A of coolant water passing through the engine 2; and a first branched path 11 and a second branched path 12 arranged in the middle of the circulation path 3A. The first branched path 11 is branched from the circulation path 3A at a branching point 13 at which the thermostat 8 is disposed. Then, the first branched path 11 joins the circulation path 3A again at a branching point 14 between the engine 2 and the radiator 9. The second branched path 12 is branched from the circulation path 3A at a branching point 15 between the branching point 13 and the radiator 9. Then, the second branched path 12 joins the circulation path 3A again at a branching point 16 between the branching point 14 and the radiator 9. The cooling water circuit 3 includes a first coolant water circuit 4, a second coolant water circuit 5, and a third coolant water circuit 6.

The first coolant water circuit 4 belongs to the circulation path 3A. The engine 2, the first water pump 7, the thermostat 8, and the radiator 9 are sequentially interposed in the circulation path 3A of coolant water passing through the engine 2. The coolant water having passed through the engine 2 is pressure-fed by the first water pump 7. The coolant water pressure-fed from the first water pump 7 passes through the thermostat 8 configured to adjust, according to the temperature of coolant water, the amount of coolant water flowing into the radiator 9. The coolant water having passed through the thermostat 8 passes through the radiator 9. The coolant water having passed through the radiator 9 is fed to the engine 2 again, thereby cooling the engine.

The first water pump 7 is configured to pressure-feed coolant water such that the coolant water circulates in the first coolant water circuit 4. The first water pump 7 is driven by the engine 2. Note that the first water pump 7 may be driven by other drive units such as an electric motor. Moreover, the radiator 9 is a heat exchanger configured to exchange heat between traveling air generated by traveling of the vehicle or air sent by a not-shown fan and coolant water circulating in the first coolant water circuit 4.

The second coolant water circuit 5 belongs to a circulation path 5A of coolant water passing through the engine 2. The circulation path 5A includes a portion of the first coolant water circuit 4 and the first branched path 11. The engine 2, the first water pump 7, and the thermostat 8 are sequentially interposed in the circulation path 5A. The coolant water having passed through the engine 2 is pressure-fed by the first water pump 7. The coolant water pressure-fed from the first water pump 7 passes, instead of flowing into the radiator 9, through the first branched path 11 by way of the thermostat 8, and then, is fed to the engine 2 again.

Thus, the thermostat 8 adjusts, based on the temperature of coolant water having passed through the engine 2, the coolant water pressure-fed from the first water pump 7 such that the coolant water flows into the radiator 9 or the first branched path 11. That is, the thermostat 8 is an opening degree adjustment unit configured to adjust the path opening degree of each of the first coolant water circuit 4 and the second coolant water circuit 5 based on the temperature of coolant water after passage through the engine 2. For example, upon the start of the engine 2 or in a low-load operation state of the engine 2, the temperature of coolant water flowing into the engine 2 is adjusted not to be extremely low such that the amount of coolant water circulating in the second coolant water circuit 5 increases and that the amount of coolant water circulating in the first coolant water circuit 4 decreases. As a result, the amount of coolant water flowing into the first branched path 11 increases. Accordingly, the amount of coolant water flowing into the radiator 9 decreases.

On the other hand, in a high-load operation state of the engine 2, adjustment is made to sufficiently cool the engine 2 such that the amount of coolant water circulating in the second coolant water circuit 5 decreases and that the amount of coolant water circulating in the first coolant water circuit 4 increases. As a result, the amount of coolant water flowing into the first branched path 11 decreases. Accordingly, the amount of coolant water flowing into the radiator 9 increases.

The third coolant water circuit 6 belongs to a circulation path 6A of coolant water. The circulation path 6A includes a portion of the first coolant water circuit 4 and the second branched path 12. The circulation path 6A includes a second water pump 10 interposed in the second branched path 12, and the radiator 9 interposed in the first coolant water circuit 4. Coolant water pressure-fed by the second water pump 10 passes through the radiator 9, and then, is fed to the second pump 10 again. The radiator 9 in the first coolant water circuit 4 is shared as the radiator 9 in the third coolant water circuit 6. The second water pump 10 is configured to pressure-feed coolant water such that the coolant water circulates in the third coolant water circuit 6. In the present embodiment, the second water pump 10 is driven by an electric motor.

Thus, when coolant water circulates in the first coolant water circuit 4 by driving of the first pump 7 and circulates in the third coolant water circuit 6 by driving of the second water pump 10, the coolant water pressure-fed by the first pump 7 to circulate in the first coolant water circuit 4 and the coolant water pressure-fed by the second water pump 10 to circulate in the third coolant water circuit 6 join together at the branching point 15 right before the radiator 9. After having passed through the radiator 9, the joined coolant water is, at the branching point 16, branched into coolant water flowing toward the second branched path 12 and coolant water flowing toward the engine 2 of the first coolant water circuit 4.

For example, upon the start of the engine 2 or in the low-load operation state of the engine 2, when no coolant water circulates in the first coolant water circuit 4, only the coolant water pressure-fed by the second water pump 10 to circulate in the third coolant water circuit passes through the radiator 9. The coolant water having passed through the radiator 9 is, instead of flowing toward the engine 2 at the branching point 16, fed to the second water pump 10 again, and then, circulates in the third coolant water circuit.

In the example, the first pump 7 is disposed between the engine 2 and the branching point 13 at which the thermostat 8 is disposed. The first pump 7 pressure-feeds coolant water to the thermostat 8 after the coolant water has passed through the engine 2. Note that the first pump 7 may be disposed between the engine 2 and the branching point 14 of the first branched path 11 such that coolant water is pressure-fed to the engine 2 before the coolant water passes through the engine 2. In this case, the engine 2, the thermostat 8, the radiator 9, and the first pump 7 are sequentially interposed in the circulation path 3A of coolant water passing through the engine 2. That is, the first water pump 7 may be disposed between the engine 2 and the first branched path 11.

The thermostat 8 is disposed at the branching point 13 of the first branched path 11 branched from the circulation path 3A. Note that the thermostat 8 may be disposed at the branching point 14 at which the first branched path 11 joins the circulation path 3A. In this case, the engine 2, the first water pump 7, the radiator 9, and the thermostat 8 are sequentially interposed in the circulation path 3A of coolant water passing through the engine 2. The thermostat 8 makes adjustment based on the temperature of coolant water passing through the first branched path 11 after having passed through the engine 2, thereby returning, to the engine 2, coolant water having passed through the radiator 9 or coolant water having passed through the first branched path 11 without passing through the radiator. In this case, the thermostat 8 is an opening degree adjustment unit configured to adjust the path opening degree of each of the first coolant water circuit 4 and the second coolant water circuit 5 based on the temperature of coolant water passing through the first branched path 11 after having passed through the engine 2.

A check valve 17 is disposed between the branching point 14 and the branching point 16 at the circulation path 3A of the first coolant water circuit 4. This prevents coolant water circulating in the second coolant water circuit 5 from flowing back to the radiator 9 and the second branched path 12.

Next, the Rankine cycle 30 will be described. The Rankine cycle 30 includes a circulation path 30A in which working fluid circulates. A heater 31 configured to heat and evaporate the working fluid, an expander 32 configured to expand the working fluid having passed through the heater 31 to generate power, a condenser 33 configured to condense the working fluid having passed through the expander 32, and a working fluid pump 34 configured to feed, to the heater 31, the working fluid having passed through the condenser 33 are sequentially interposed in the circulation path 30A. The working fluid pump 34 is configured to pressure-feed the working fluid such that the working fluid circulates in the circulation path 30A. In the present embodiment, the working fluid pump 34 is driven by an electric motor. Moreover, the Rankine cycle 30 includes a not-shown electric generator and a not-shown battery. The electric generator is configured to convert the power generated by the expander 32 into electric power, thereby generating the electric power. The electric power generated by the electric generator is stored in the battery. As described above, a system is formed, which is configured to recover waste heat of the engine 2 as electric power. In the example, a system configured to recover waste heat of the engine 2 as electric power is formed. Note that such a system may be a system configured to directly provide, instead of recovering waste heat as electric power, the engine 2 with the power generated by the expander 32 to assist the engine 2.

The heater 31 is interposed in the first branched path 11 in the second coolant water circuit 5. Thus, the heater 31 is a heat exchanger configured to exchange heat between the working fluid of the Rankine cycle 30 and coolant water passing through the first branched path 11 of the second coolant water circuit. That is, in the heater 31, heat is exchanged between high-temperature coolant water not passing through the radiator 9 right after having absorbed waste heat of the engine 2 upon passage through the engine 2 and the working fluid of the Rankine cycle 30. Thus, the working fluid can be sufficiently heated and evaporated.

Moreover, the condenser 33 is interposed upstream of the second water pump 10 in the second branched path 12 of the third coolant water circuit 6. Thus, the condenser 33 is a heat exchanger configured to exchange heat between the working fluid of the Rankine cycle 30 and coolant water passing through the second branched path 12 of the third coolant water circuit. That is, in the condenser 33, heat is exchanged between low-temperature coolant water having passed through the radiator 9 without passing through the engine 2 and the working fluid of the Rankine cycle 30. Thus, the pressure of condensation of the working fluid can be decreased by sufficient condensation of the working fluid. Consequently, the thermal efficiency of the Rankine cycle 30 can be improved by a simple structure merely utilizing an existing radiator. The second water pump 10 of the third coolant water circuit 6 is disposed downstream of the condenser 33. Note that the second water pump 10 may be disposed upstream of the condenser 33.

Figure 2:
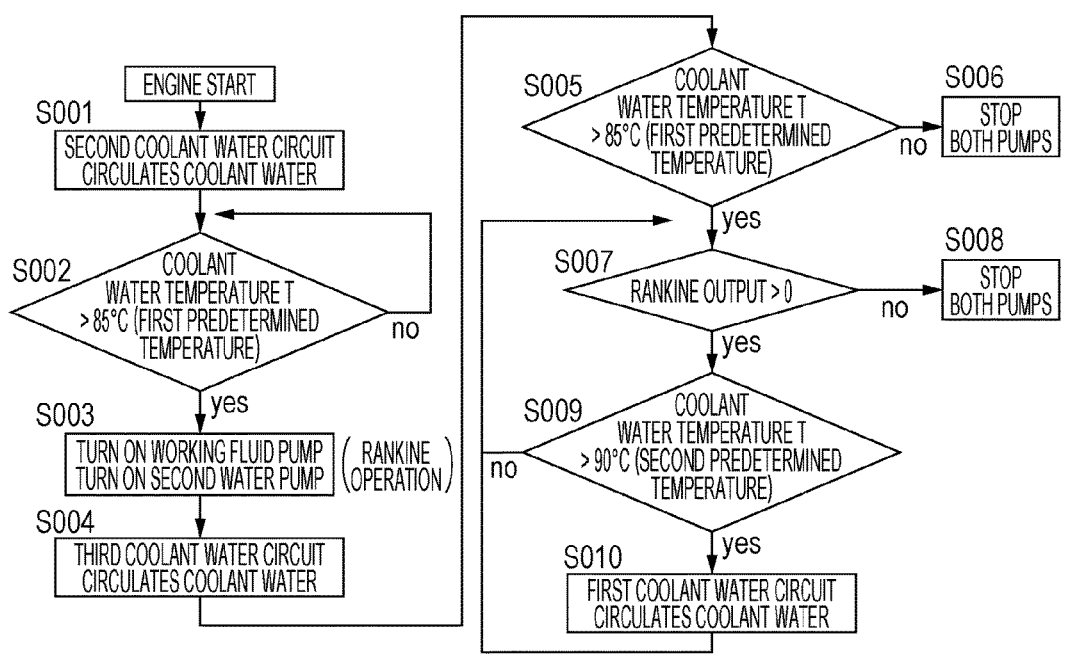
FIG. 2 is a flow chart of control of the vehicle waste heat recovery device of the example.

Next, operation control of the vehicle waste heat recovery device 1 of the example will be described with reference to FIGS. 1 and 2. A water temperature sensor 41 is disposed upstream of the heater 31 of the first branched path 11. The water temperature sensor 41 is a coolant water temperature detection unit configured to detect the temperature of coolant water before the coolant water flows into the heater 31 and after the coolant water has passed through the engine 2. A control device 40 as a control unit connected to the water temperature sensor 41 is configured to control driving of the working fluid pump 34 and the second water pump 10.

Upon the start of the engine 2 or in the low-load operation state of the engine 2, the coolant water temperature detected by the water temperature sensor 41 does not reach a predetermined temperature A (e.g., 80° C.) required for maintaining a suitable temperature for preventing overcooling of the engine 2. For this reason, coolant water circulates only in the second coolant water circuit 5 (S001). In this state, when the working fluid pump 34 and the second water pump 10 are actuated to operate the Rankine cycle 30, the temperature of coolant water circulating in the second coolant water circuit 4 decreases due to heat exchange in the heater 31, and therefore, does not reach the predetermined temperature A. Thus, the Rankine cycle 30 is not operated.

When the engine 2 is heated up, the coolant water temperature exceeds the predetermined temperature A. Then, the water temperature sensor 41 detects, as the temperature of coolant water circulating in the second coolant water circuit 5 by operation of the Rankine cycle 30, a temperature at such a level that the coolant water temperature does not fall below the predetermined temperature A by heat exchange in the heater 31, such as a predetermined temperature B set higher than the predetermined temperature A by 5° C. (S002). Subsequently, the control device 40 drives the working fluid pump 34 and the second water pump 10 to operate the Rankine cycle 30 (S003). In this state, coolant water circulates in the second coolant water circuit 5 and the third coolant water circuit 6 (S004), but does not circulate in the first coolant water circuit 4. Thus, in the heater 31 of the Rankine cycle 30, heat is recovered from high-temperature coolant water having passed through the engine 2. Then, in the condenser 33 of the Rankine cycle 30, the working fluid is sufficiently condensed by heat exchange between low-temperature coolant water having passed through the radiator 9 without passing through the engine 2 and the working fluid of the Rankine cycle 30, and therefore, the pressure of condensation of the working fluid can be decreased. Thus, the thermal efficiency of the Rankine cycle 30 can be improved.

When the coolant water temperature detected by the water temperature sensor 41 reaches equal to or lower than the predetermined temperature B (S005), the control device 40 stops driving of the working fluid pump 34 and the second water pump 10 (S006), and in this manner, operation of the Rankine cycle 30 is stopped. This is because the engine 2 cannot be maintained at a suitable temperature even when waste heat could be recovered by the vehicle waste heat recovery device 1.

The control device 40 includes a Rankine output calculation unit 42 configured to calculate the output of the Rankine cycle 30, an expander output calculation unit 43 configured to calculate the Rankine output, and a Rankine input calculation unit 44 configured to calculate an Rankine input required for operation of the Rankine cycle 30. During operation of the Rankine cycle 30, an expander output recovered by the Rankine cycle 30 and the input required for operation of the Rankine cycle 30 such as drive power for the working fluid pump 34 and drive power for the second water pump 10 are constantly monitored, for example. When the Rankine output as a value obtained by subtracting the Rankine input from the expander output is a negative value (S007), the control device 40 stops driving of the working fluid pump 34 and the second water pump 10 (S008). Note that the Rankine output is not limited to above. For example, the Rankine output may be obtained from, e.g., the high-pressure-side pressure of the Rankine cycle 30, the low-pressure-side pressure of the Rankine cycle 30, or the flow rate of the working fluid.

When the engine 2 is brought into a high-load operation state, the temperature of coolant water having passed through the engine 2 exceeds the predetermined temperature B. For example, when the coolant water temperature reaches a predetermined temperature C set higher than the predetermined temperature A by 10° C. (S009), a thermostat 8 adjusts the path opening degree of the first coolant water circuit 4 and the path opening degree of the second coolant water circuit 5 such that coolant water flows toward the radiator 9 to maintain the engine 2 at a suitable temperature. In this state, coolant water circulates in each of the first coolant water circuit 4, the second coolant water circuit 5, and the third coolant water circuit 6 (S010). Thus, the coolant water circulating in the first coolant water circuit 4 and the coolant water circulating in the third cooling circuit 6 join together at a branching point 15, and then, flow into the radiator 9.

The coolant water having passed through the radiator 9 circulates such that the coolant water is, at a branching point 16, branched into coolant water flowing toward a second branched path 12 and coolant water flowing toward the engine 2 of the first coolant water circuit 4. Thus, in the radiator 9, traveling air generated by traveling of the vehicle and air sent by a not-shown fan exchange heat with each of coolant water circulating in the first coolant water circuit 4 after having passed through the engine 2 and coolant water of the third coolant water circuit 6 having exchanged heat with the working fluid in the condenser 33 of the Rankine cycle 30.

When the high-load operation state of the engine 2 is continued, the temperature of coolant water having passed through the engine 2 further exceeds the predetermined temperature C. Thus, the thermostat 8 adjusts the path opening degree of the first coolant water circuit 4 and the path opening degree of the second coolant water circuit 5 such that more coolant water flows toward the radiator than toward the first branched path 11 to maintain a suitable temperature of the engine 2. In this state, the temperature of coolant water flowing into the radiator 9 increases. Thus, the temperature of coolant water circulating in the third coolant water circuit 6 to pass through the condenser 33 also increases. As a result, the working fluid cannot be sufficiently condensed in the condenser 33. For this reason, there is no difference between the high pressure and the low pressure of the Rankine cycle 30, leading to a negative value of the Rankine output.

Thus, even when the coolant water temperature exceeds the predetermined temperature C after passage through the engine, the control device 40 constantly monitors, during operation of the Rankine cycle 30, a expander output recovered by the Rankine cycle 30 and an input required for operation of the Rankine cycle 30 such as drive power for the working fluid pump 34 and drive power for the second water pump 10, for example. When the Rankine output as a value obtained by subtracting the Rankine input from the expander output is a negative value (S007), the control device 40 stops driving of the working fluid pump 34 and the second water pump 10 (S008).

Next, a vehicle waste heat recovery device 50 of another example of the present invention will be described. The vehicle waste heat recovery device 50 of the second embodiment includes, as in the first embodiment, an engine 2 as an internal combustion engine mounted on a vehicle, a coolant water circuit 3 configured to cool the engine 2, and a Rankine cycle configured to convert waste heat of the engine 2 into electric power or rotary drive force for assisting the engine 2 to recover the waste heat. Note that the second embodiment is different from the first embodiment in that a heater 31 of the Rankine cycle is not interposed in the second coolant water circuit 5.

In the present example, description of a common configuration with that of the first embodiment will be omitted by reference of description of the above example. Moreover, in such description, the same reference numerals as those of the previous example will be used.

A Rankine cycle 60 includes a circulation path 60A in which working fluid circulates. A heater 61 configured to heat and evaporate the working fluid, an expander 32 configured to expand the working fluid having passed through the heater 61 to generate power, a condenser 33 configured to condense the working fluid having passed through the expander 32, and a working fluid pump 34 configured to feed, to the heater 61, the working fluid having passed through the condenser 33 are sequentially interposed in the circulation path 60A. The working fluid pump 34 is configured to pressure-feed the working fluid such that the working fluid circulates in the circulation path 60A. In the present embodiment, the working fluid pump 34 is driven by an electric motor. Moreover, the Rankine cycle 60 includes a not-shown electric generator and a not-shown battery. The electric generator is configured to convert the power generated by the expander 32 into electric power, thereby generating the electric power. The electric power generated by the electric generator is stored in the battery. As described above, a system is formed, which is configured to recover waste heat of the engine 2 as electric power. In the second embodiment, a system configured to recover waste heat of the engine 2 as electric power is formed. Note that such a system may be a system configured to directly provide, instead of recovering waste heat as electric power, the engine 2 with the power generated by the expander 32 to assist the engine 2.

The heater 61 is a heat exchanger contacting an exhaust gas pipe 51 of the engine 2. The heater 61 is configured to use, as a heat source, exhaust gas discharged from the engine 2 to heat and evaporate the working fluid of the Rankine cycle 60. Moreover, the exhaust gas pipe 51 is provided with an exhaust gas temperature detection sensor 52 as an exhaust gas temperature detection unit configured to detect the temperature of exhaust gas passing through the exhaust gas pipe. Note that the heater 61 may be a heat exchanger configured to exchange, via fluid such as water, heat with the exhaust gas pipe 51 of the engine 2.

Figure 3:
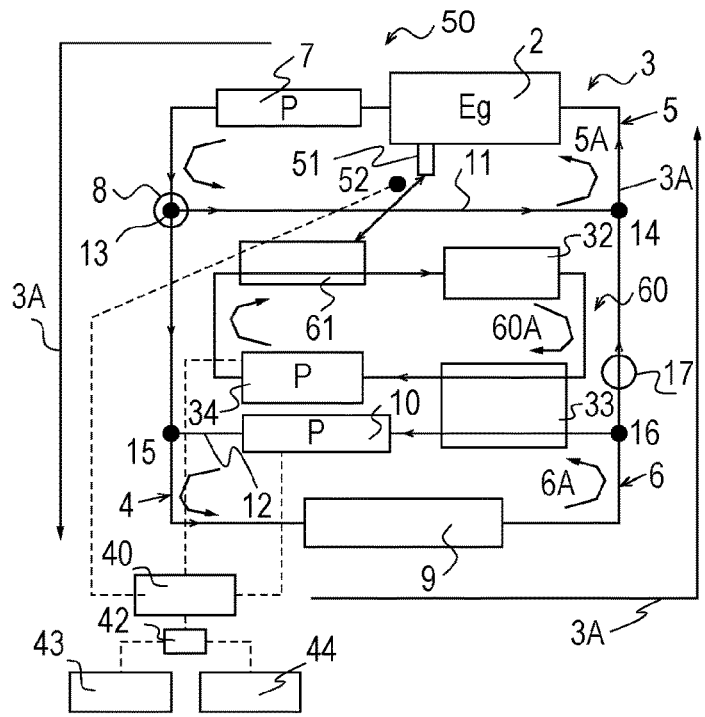
FIG. 3 is a configuration diagram of a vehicle waste heat recovery device of another example.
Figure 4:
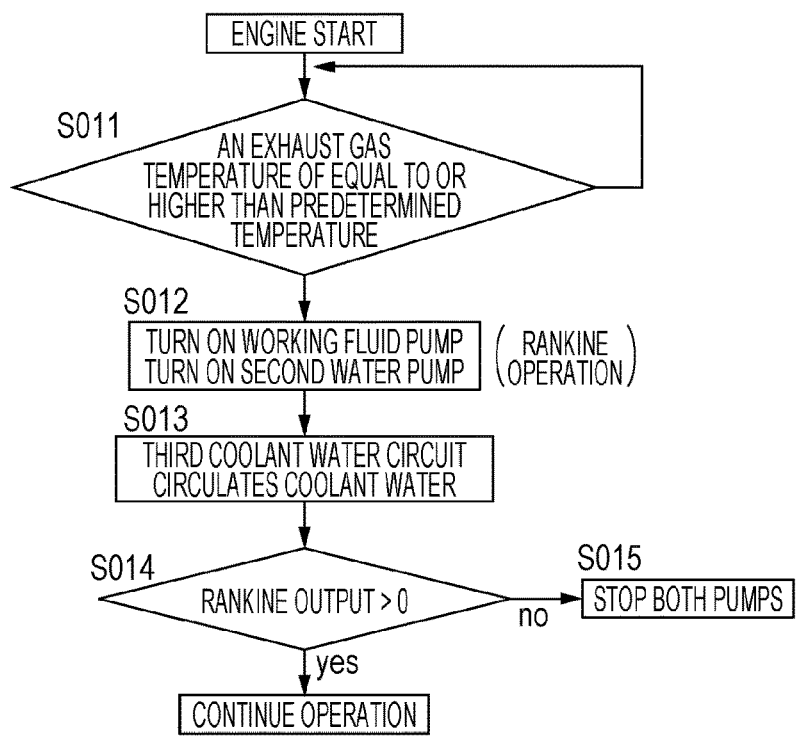
FIG. 4 is a flow chart of control of the vehicle waste heat recovery device of the other example.

Next, operation control of the vehicle waste heat recovery device 50 of this example will be described with reference to FIGS. 3 and 4. The exhaust gas temperature detection sensor 52 is connected to a control device 40 as a control unit. The control device 40 is configured to control driving of the working fluid pump 34 and a second water pump 10.

When the engine 2 is started, coolant water circulates in a second coolant water circuit 5. Moreover, when the exhaust gas temperature detected by the exhaust gas temperature detection sensor 52 reaches a predetermined temperature D as a sufficient temperature for recovering heat in the Rankine cycle 60 (S011), the control device 40 drives the working fluid pump 34 and the second water pump 10 to operate the Rankine cycle 60 (S012). Accordingly, coolant water circulates in a third coolant water circuit 6 (S013).

Upon the start of the engine 2 or in a low-load operation state of the engine 2, the temperature of coolant water does not reach a predetermined temperature A (e.g., 80° C.) required for maintaining the engine 2 at a suitable temperature. For this reason, no coolant water flows toward a radiator 9. As a result, no coolant water circulates in a first coolant water circuit 4. Thus, coolant water circulates in the second coolant water circuit 5 and the third coolant water circuit 6, but does not circulates in the first coolant water circuit 4. In the condenser 33 of the Rankine cycle 60, the working fluid is sufficiently condensed by heat exchange between low-temperature coolant water having passed through the radiator 9 without passing through the engine 2 and the working fluid of the Rankine cycle 60, and therefore, the pressure of condensation of the working fluid can be decreased. Thus, the thermal efficiency of the Rankine cycle 60 can be improved.

The control device 40 includes a Rankine output calculation unit 42 configured to calculate the output of the Rankine cycle 60, an expander output calculation unit 43 configured to calculate the Rankine output, and a Rankine input calculation unit 44 configured to calculate an Rankine input required for operation of the Rankine cycle 60. During operation of the Rankine cycle 60, an expander output recovered by the Rankine cycle 60 and the input required for operation of the Rankine cycle 60 such as drive power for the working fluid pump 34 and drive power for the second water pump 10 are constantly monitored, for example. When the Rankine output as a value obtained by subtracting the Rankine input from the expander output is a negative value (S014), the control device 40 stops driving of the working fluid pump 34 and the second water pump 10 (S015). Note that the Rankine output is not limited to above. For example, the Rankine output may be obtained from, e.g., the high-pressure-side pressure of the Rankine cycle 60, the low-pressure-side pressure of the Rankine cycle 60, or the flow rate of the working fluid.

When the engine 2 is brought into a high-load operation state, the temperature of coolant water having passed through the engine 2 exceeds the predetermined temperature A. For example, when the coolant water temperature reaches a predetermined temperature C set higher than the predetermined temperature A by 10° C., a thermostat 8 adjusts the path opening degree of the first coolant water circuit 4 and the path opening degree of the second coolant water circuit 5 such that coolant water flows toward the radiator to maintain the engine at a suitable temperature. In this state, coolant water circulates in each of the first coolant water circuit 4, the second coolant water circuit 5, and the third coolant water circuit 6. Thus, the coolant water circulating in the first coolant water circuit 4 and the coolant water circulating in the third cooling circuit 6 join together at a branching point 15, and then, flow into the radiator 9.

The coolant water having passed through the radiator 9 circulates such that the coolant water is, at a branching point 16, branched into coolant water flowing toward a second branched path 12 and coolant water flowing toward the engine 2 of the first coolant water circuit 4. Thus, in the radiator 9, traveling air generated by traveling of the vehicle and air sent by a not-shown fan exchange heat with each of coolant water circulating in the first coolant water circuit 4 after having passed through the engine 2 and coolant water of the third coolant water circuit 6 having exchanged heat with the working fluid in the condenser 33 of the Rankine cycle 60.

When the high-load operation state of the engine 2 is continued, the temperature of coolant water having passed through the engine 2 further exceeds the predetermined temperature C Thus, the thermostat 8 adjusts the path opening degree of the first coolant water circuit 4 and the path opening degree of the second coolant water circuit 5 such that more coolant water flows toward the radiator than toward the first branched path 11 to maintain a suitable temperature of the engine 2. In this state, the temperature of coolant water exchanging heat in the radiator 9 increases. Thus, the temperature of coolant water circulating in the third coolant water circuit 6 to pass through the condenser 33 also increases. As a result, the working fluid cannot be sufficiently condensed in the condenser 33. For this reason, there is no difference between the high pressure and the low pressure of the Rankine cycle 60, leading to a negative value of the Rankine output.

Thus, even when the coolant water temperature exceeds the predetermined temperature C after passage through the engine, the control device 40 constantly monitors, during operation of the Rankine cycle 60, a Rankine output recovered by the Rankine cycle 60 and an input required for operation of the Rankine cycle 60 such as drive power for the working fluid pump 34 and drive power for the second water pump 10, for example. When the Rankine output is a negative value (S014), the control device 40 stops driving of the working fluid pump 34 and the second water pump 10 (S015).

In the examples, the engine 2 is an engine for a vehicle. Note that the present embodiments are not necessarily limited to the vehicle engine. The present embodiments may be applied to a stationary engine.

The invention claimed is:
1. A waste heat recovery device comprising:
   a Rankine cycle including a working fluid circuit, the working fluid circuit including:
      a heater configured to heat and evaporate working fluid,
      an expander configured to expand the working fluid having passed through the heater to generate power,
      a condenser configured to condense the working fluid having passed through the expander, and
      a working fluid pump configured to feed, to the heater, the working fluid having passed through the condenser,
      wherein the heater, the expander, the condenser and the working fluid pump are sequentially arranged;
   a first coolant water circuit configured to circulate coolant water by way of an internal combustion engine and a radiator;
   a second coolant water circuit configured to circulate the coolant water by way of the internal combustion engine and a first branched path branched between the internal combustion engine and the radiator; and
   a third coolant water circuit configured to circulate the coolant water by way of the radiator and a second branched path branched between the first branched path and the radiator, wherein
   a heat source of the heater is waste heat of the internal combustion engine,
   the condenser is a heat exchanger configured to exchange heat between the working fluid and the coolant water of the third coolant water circuit, and
   a check valve configured to prevent a backflow of the coolant water toward the radiator is provided between the first branched path and the second branched path on a downstream side of the radiator in the first coolant water circuit.

2. The waste heat recovery device according to claim 1, wherein
   a first water pump configured to circulate the coolant water is provided between the internal combustion engine and the first branched path,
   a second water pump configured to circulate the coolant water is provided at the second branched path, and
   an opening degree adjustment unit configured to adjust a path opening degree of each of the first and second coolant water circuits based on a coolant water temperature after passage through the internal combustion engine is provided at a branching point of the first branched path.

3. The waste heat recovery device according to claim 2, further comprising:
   a waste heat state detection unit configured to detect a waste heat state of the internal combustion engine; and
   a control unit configured to control driving of the second water pump and driving of the working fluid pump, wherein when the waste heat state of the internal combustion engine detected by the waste heat state detection unit exceeds a first predetermined value, the control unit drives the second water pump and the working fluid pump.

4. The waste heat recovery device according to claim 3, wherein the control unit includes a Rankine output calculation unit configured to calculate an output of the Rankine cycle, and when the Rankine output calculated by the Rankine output calculation unit is a negative value, the control unit stops driving of the second water pump and the working fluid pump.

5. The waste heat recovery device according to claim 2, wherein the heater is a heat exchanger configured to exchange heat between the working fluid and the coolant water of the second coolant water circuit.

6. The waste heat recovery device according to claim 5, further comprising:

a coolant water temperature detection unit configured to detect the coolant water temperature after passage through the internal combustion engine; and a control unit configured to control driving of the second water pump and driving of the working fluid pump, wherein when the coolant water temperature detected by the coolant water temperature detection unit exceeds a first predetermined temperature, the control unit drives the second water pump and the working fluid pump.

7. The waste heat recovery device according to claim 6, wherein the control unit includes a Rankine output calculation unit configured to calculate an output of the Rankine cycle, and when the coolant water temperature detected by the coolant water temperature detection unit is equal to or lower than the first predetermined temperature or the Rankine output calculated by the Rankine output calculation unit is a negative value, the control unit stops driving of the second water pump and the working fluid pump.

8. The waste heat recovery device according to claim 6, wherein the first predetermined temperature is set higher than a minimum coolant water temperature for preventing overcooling of the internal combustion engine and lower than the coolant water temperature after passage through the internal combustion engine when the path opening degree of the first coolant water circuit is changed from a closed state to an open state by the opening degree adjustment unit.

* * * * *